(12) United States Patent
Anderson et al.

(10) Patent No.: US 10,186,065 B2
(45) Date of Patent: Jan. 22, 2019

(54) TECHNOLOGIES FOR MOTION-COMPENSATED VIRTUAL REALITY

(71) Applicant: Intel Corporation, Santa Clara, CA (US)

(72) Inventors: Glen J. Anderson, Beaverton, OR (US); Richard T. Beckwith, Hillsboro, OR (US); Ankur Agrawal, Portland, OR (US); Meng Shi, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 41 days.

(21) Appl. No.: 15/283,333

(22) Filed: Oct. 1, 2016

(65) Prior Publication Data

US 2018/0096501 A1    Apr. 5, 2018

(51) Int. Cl.
| | |
|---|---|
| *G06T 11/60* | (2006.01) |
| *G02B 27/01* | (2006.01) |
| *B60K 35/00* | (2006.01) |
| *G06F 3/01* | (2006.01) |
| *G06T 19/00* | (2011.01) |

(52) U.S. Cl.
CPC .............. *G06T 11/60* (2013.01); *B60K 35/00* (2013.01); *G02B 27/0179* (2013.01); *G06F 3/011* (2013.01); *G02B 2027/0183* (2013.01); *G06T 19/006* (2013.01); *G06T 2200/16* (2013.01)

(58) Field of Classification Search
CPC ... G06T 11/60; G06T 19/006; G06T 2200/16; G02B 27/0179; G02B 2027/0183; G06F 3/005; G06F 3/012; G06F 3/017
See application file for complete search history.

(56) References Cited

U.S. PATENT DOCUMENTS

| 9,986,219 B1* | 5/2018 | Ross | H04N 9/8715 |
| 2015/0097860 A1* | 4/2015 | Alaniz | G06F 3/011 |
| | | | 345/633 |
| 2015/0100179 A1 | 4/2015 | Alaniz et al. | |

(Continued)

FOREIGN PATENT DOCUMENTS

WO    2010-004547    1/2010

OTHER PUBLICATIONS

International search report for PCT application No. PCT/US2017/047542, dated Nov. 30, 2017 (3 pages).

(Continued)

*Primary Examiner* — Jwalant Amin
(74) *Attorney, Agent, or Firm* — Barnes & Thornburg LLP

(57) ABSTRACT

Technologies for motion-compensated virtual reality include a virtual reality compute device of a vehicle. The virtual reality compute device is configured to render a virtual reality content to an occupant of the vehicle and determine a motion of the vehicle based at least on sensor data generated by one or more vehicle motion sensors of the vehicle. Based on the determined motion of the vehicle, the virtual reality compute device modifies the rendered virtual reality media. In some embodiments, the virtual reality compute device may utilize other sensors associated with the vehicle and/or a user-worn virtual reality device to predict the motion of the vehicle in order to determine an expected motion of the vehicle that is expected to be sensed in the future.

21 Claims, 7 Drawing Sheets

(56) References Cited

U.S. PATENT DOCUMENTS

| | | | |
|---|---|---|---|
| 2015/0253409 A1* | 9/2015 | Feiweier | G01R 33/307 |
| | | | 324/307 |
| 2016/0033963 A1* | 2/2016 | Noh | H04W 4/046 |
| | | | 701/2 |
| 2017/0115488 A1* | 4/2017 | Ambrus | G02B 27/0172 |
| 2018/0028931 A1* | 2/2018 | Bear | A63F 13/92 |

OTHER PUBLICATIONS

Written opinion for PCT application No. PCT/US2017/047542, dated Nov. 30, 2017 (7 pages).

* cited by examiner

| MOTION | DEFAULT VR MOTION ADJUSTMENT | MEDIA INDEXED ADJUSTMENT |
|---|---|---|
| VEHICLE LEFT TURN | LEFT TURN | GAME A – LEFT TILT<br>GAME B – LEFT SPIN |
| VEHICLE RIGHT TURN | RIGHT TURN | GAME A – RIGHT TILT<br>GAME B – RIGHT SPIN |
| ROAD BUMP | TURBULENCE | GAME A – VIDEO STATIC<br>GAME B – DAMAGING HIT |
| USER HEAD LEFT TILT | LEFT ROLL | GAME A – LEFT ROLL<br>GAME B – LEFT TURN |
| USER HEAD RIGHT TILT | RIGHT ROLL | GAME A – RIGHT ROLL<br>GAME B – RIGHT TURN |
| USER HEAD LEFT PAN | LEFT PAN | GAME A – LEFT PAN<br>GAME B – LEFT SPIN |
| USER HEAD RIGHT PAN | RIGHT PAN | GAME A – RIGHT PAN<br>GAME B – RIGHT SPIN |

FIG. 3

TECHNOLOGIES FOR MOTION-COMPENSATED VIRTUAL REALITY

BACKGROUND

Virtual Reality (VR) technology includes techniques for providing virtual images of a virtual space on a virtual reality display. In typical virtual reality systems, the virtual reality display completely encompasses a user's view to provide a greater sense of immersion into the virtual surroundings. For example, virtual reality systems may include "VR goggles", "VR helmets," and/or other "heads-up displays." However, such view-encompassing, head-mounted VR displays can induce nausea in some users due to inconsistencies between the VR content and physiological stimulus experienced by the user. For example, a head-mounted VR display may induce nausea in a user by rendering motion (or no motion) that is different from the user's bodily motion. For example, moving forward in a virtual space while the user remains still may induce motion sickness and/or nausea. Additionally, latency between the user's physical movements (e.g., head movements) and the responsive update of the VR objects displayed on the head-mounted VR display may induce motion sickness and/or nausea.

Augmented Reality (AR) technology is similar to VR technology and includes techniques for displaying virtual objects or images on real space or on a display of an image of that real space. As with virtual reality systems, augmented reality system can induce nausea in a user who is viewing a real-world object in real space while motion causes a physiological stimulus that is discordant with the real-world object or the environment that viewer is seeing.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 3 is a simplified table of at least one example of a motion-to-virtual reality content mapping that may be managed by the virtual reality compute device of FIGS. 1 and 2;

DETAILED DESCRIPTION OF THE DRAWINGS

Figure 1:
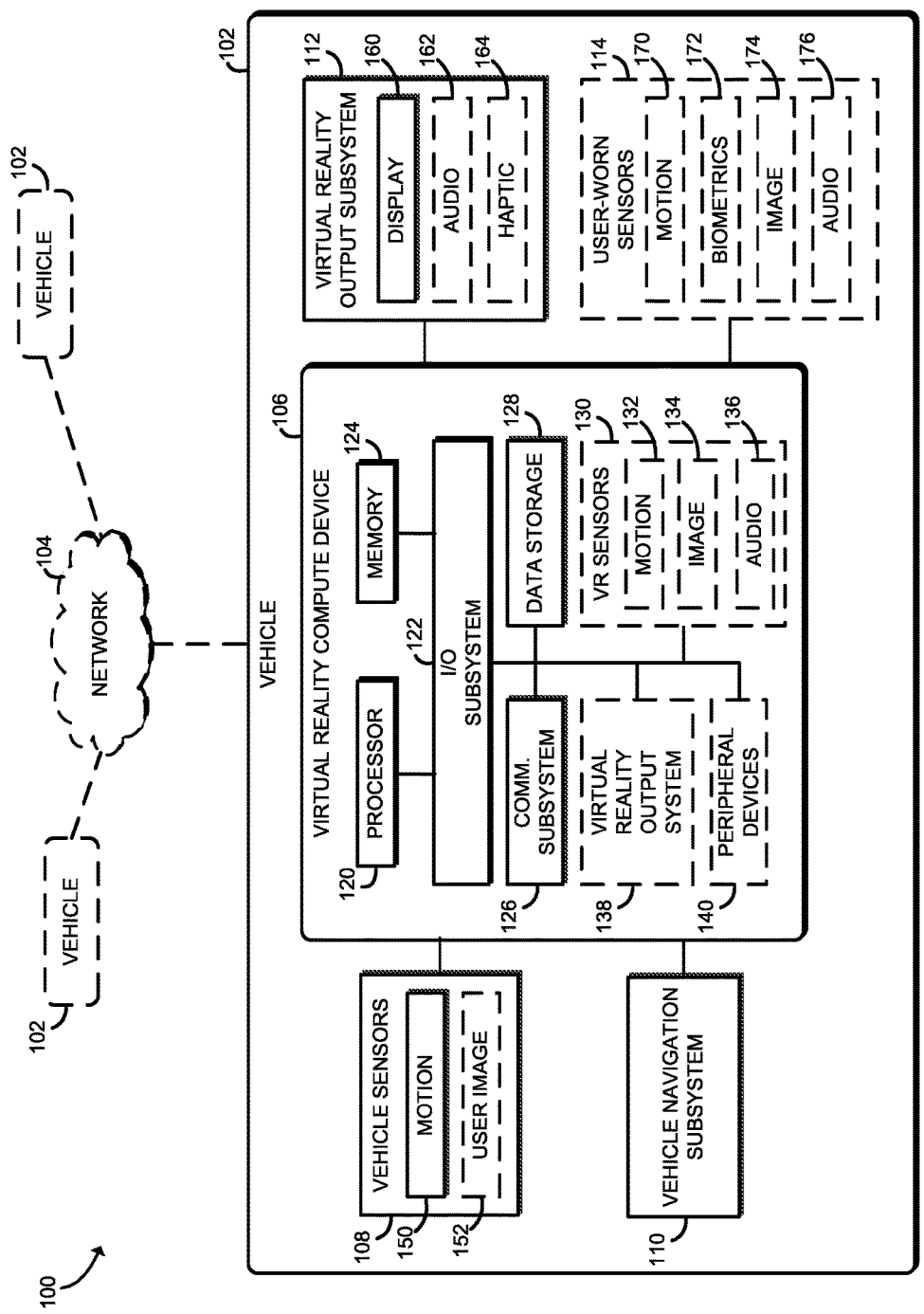
FIG. 1 is a simplified block diagram of at least one embodiment of a system for rendering motion-compensated virtual reality based on a motion of a vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for rendering virtual reality media to an occupant of the vehicle 102 includes a virtual reality compute device 106. In use, as discussed in more detail below, the virtual reality compute device 106 is configured to update, modify, or otherwise compensate the rendered virtual reality media content based on a determined or predicted motion of the vehicle 102. The virtual reality compute device 106 may be configured to compensate for any type of motion of the vehicle such as a turn, bumps, grades, changes in direction, unexpected motion, and/or the like. As discussed in more detail below, the virtual reality compute device 106 may determine or predict the motion of the vehicle 102 based on, for example, sensor data produced by one or more vehicle sensors of the vehicle 102, navigation data from a vehicle navigation subsystem 110 of the vehicle 102, user context data produced from other vehicle sensors 108 of the vehicle 102, user context data produced from one or more user-worn sensors 114, crowd-sourced data received from other vehicles 102, and/or other data useful in determining or predicting a motion of the vehicle 102.

Although described as below as a "virtual reality" compute device, it should be appreciated that the compute device 106 may be embodied at render augmented reality media content instead of, or in addition to, virtual reality media content. For example, augmented or virtual reality objects may be displayed or overlaid on a clear display such that an occupant of the vehicle 102 can still see the real-world environment and/or real-world objects outside of the vehicle 102. In such embodiments, the virtual reality compute device 106 is also configured to update, modify, or otherwise compensate the rendered augmented reality media content based on a determined or predicted motion of the vehicle 102. As such, do the similarity between virtual reality rendering and augmented reality rendering, reference to virtual reality in the following description is equally applicable to augmented reality and should not be interpreted as necessarily limited to only virtual reality rendering and systems.

In the illustrative embodiment, the vehicle 102 is embodied as an automobile (e.g., car or truck). However, in other embodiments, the vehicle 102 may be embodied as any type of vehicle or machine capable of transporting an occupant including, but not limited to, a bus, a train, an airplane, a boat, a vehicle simulator, an amusement ride, a virtual reality environment, or any other machine, system, or environment configured to impart motion to the virtual reality compute device 106. In some embodiments, the system 100 may include multiple vehicles 102 communicating with each other over a network 104. Each vehicle 102 may share crowd-sourced motion data experienced by the corresponding vehicle 102 with other vehicles for prediction purposes as discussed below. For example, if the vehicle 102 passes a pot-hole, the vehicle 102 may generate crowd-sourced motion data associated with the geographical location of the pot-hole and the motion sensed by the vehicle 102. The vehicle 102 may subsequently transmit the generated crowd-sourced motion data to other vehicles over the network 104 such that other vehicles may predict the vehicle motion when passing that particular pot-hole.

The virtual reality compute device 106 may be embodied as any type of in-vehicle computer or computing system capable of rendering virtual reality content and performing the functions described herein. For example, in the illustrative embodiment, the virtual reality compute device 106 is embodied as, or forms a portion of, an in-vehicle infotainment system, a navigation system, and/or other vehicle-based computing system. In other embodiments, the virtual reality compute device 106 may instead be embodied as a standalone virtual reality compute device or computing system configured to interact with other systems of the vehicle 102. For example, in those embodiments, the virtual reality compute device 106 may be embodied as a stand-alone user-worn heads-up display. As illustratively shown in FIG. 1, the virtual reality compute device 106 includes a processor 120, an input/output ("I/O") subsystem 122, a memory 124, a communication subsystem 126, and a data storage 128. Of course, the virtual reality compute device 106 may include other or additional components, such as those commonly found in a virtual reality compute computer (e.g., various input/output devices and/or other components), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the virtual reality compute device 106 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the virtual reality compute device 106. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the virtual reality compute device 106, on a single integrated circuit chip.

The communication subsystem 126 may be embodied as any type of communication circuit, device, or collection thereof, capable of enabling communications between a multiple virtual reality compute devices 106. To do so, the communication subsystem 126 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The data storage 128 may be embodied as any type of device or devices configured for short-term or long-term storage of data such as, for example, memory devices and circuits, memory cards, hard disk drives, solid-state drives, or other data storage devices. In the illustrative embodiment, the virtual reality compute device 106 may be configured to store vehicle information, virtual reality contents, motion-to-virtual reality content mapping, and/or motion compensation virtual reality contents in the data storage 128.

In some embodiments, such as those in which the virtual reality compute device 106 is embodied as a head-mounted virtual reality device, the virtual reality compute device 106 may include one or more virtual reality sensors 130. The virtual reality sensors 130 may be embodied as any type of sensor capable of generating data indicative of a context of the user (e.g., motion, emotion, etc.). In the illustrative embodiment, the virtual reality sensors 130 may include a motion sensor 132, an image sensor 134, and/or an audio sensor 136. The motion sensor(s) 132 may be embodied as any type of motion sensor capable of generating or producing sensor data indicative of a motion of the user or a portion of the user's body. For example, the motion sensor 132 may be embodied as an accelerometer or gyroscope. The image sensor(s) 134 may be embodied as any type of image sensor capable of capturing an image of the user or the user's environment (e.g., an environment of the vehicle 102). For example, the image sensor 134 may be embodied as a camera. The audio sensor(s) 136 may be embodied as any type of sensor capable of generating or producing sensor data indicative of a voice of the user or background noise surrounding the user. For example, the audio sensor may be embodied as a microphone or other audio capturing device. In some embodiments, the user context data produced by the virtual reality sensors 130 may be stored as a historical user data, which may be analyzed to determine whether the virtual reality compute device 106 adequately modified and updated the virtual reality media content to compensate for the motion of the vehicle 102 as discussed in more detail below. It should be appreciated, however, that in the embodiment in which the virtual reality media content is rendered on the user-worn device, the virtual reality sensors 130 may be embodied as a part of the user-worn sensors 114, which will be discussed in detail below.

In those embodiments in which the virtual reality compute device 106 is embodied as a user-worn device, the virtual reality compute device 106 may also include a virtual reality output subsystem 138. The virtual reality output subsystem 138 may include any type of devices and components for rendering virtual reality objects to a user of the virtual reality compute device 106 including, but not limited to, virtual reality displays (e.g., goggle display screens), projectors, and/or the like.

In some embodiments, the virtual reality compute device 106 may also include one or more peripheral devices 140. The peripheral devices 140 may include any number of additional peripheral or interface devices, such as other input/output devices, storage devices, and so forth. The particular devices included in the peripheral devices 140 may depend on, for example, the type and/or configuration of the virtual reality compute device 106.

As discussed above, the virtual reality compute device 106 is communicatively coupled to the one or more vehicle sensors 108 and the vehicle navigation subsystem 110 to receive data therefrom. The one or more vehicle sensors 108 may be embodied as any type of sensors coupled to or incorporated in the vehicle 102 and capable of producing sensor data from which a motion of the vehicle may be determined or otherwise inferred. Illustratively, the vehicle sensors 108 include one or more motion sensors 150 and a user image sensor 152. The motion sensor(s) 150 may be embodied as any type of motion sensor capable of generating or producing sensor data indicative of a motion of the vehicle 102. For example, the motion sensor 150 may be embodied as an accelerometer or gyroscope. It should be appreciated that the motion sensors 150 may include different types of motion sensors to detect different types of movement of the vehicle 102. For example, one motion sensor 150 may detect turning of the vehicle 102, another motion sensor 150 may detect tilting of the vehicle 102, another motion sensor 150 may detect the present grade of the vehicle 102, etc. The user image sensor(s) 134 may be embodied as any type of image sensor, such as a camera, capable of capturing an image of the user or the user's environment (e.g., an environment of the vehicle 102). In the illustrative embodiment, the user image sensor 152 is configured to monitor location, position, orientation, movement, gesture and/or expression of the occupant of the vehicle 102. For example, the user image sensor 152 may monitor a position of occupant's head to detect a tilting of the occupant's head, which may be an indicative of a physical turn of the vehicle 102.

The vehicle navigation subsystem 110 is configured to provide navigation data based on a geographic location of the vehicle 102. The navigation data allows the virtual reality compute device 106 to predict the motion of the vehicle 102 based on a predicted travel path and/or traffic pattern associated with the predicted travel path as discussed below. The vehicle navigation subsystem 110 may be embodied as any type of navigation system capable of producing navigational data related to the movement of the vehicle 102 (e.g., map-based data). For example, the vehicle navigation subsystem 110 may employ a Global Positioning System (GPS) and/or GLONASS (Global Orbiting Navigation System) receiver to track the location of the vehicle 102.

As discussed above, the virtual reality compute device 106 may be embodied as a stand-alone, user-worn virtual reality system or may be incorporated into the vehicle 102. In those embodiments in which the virtual reality compute device 106 is incorporated into the vehicle 102, the vehicle 102 may include a virtual reality output subsystem 112 configured to render the virtual reality media content. In such embodiments, the virtual reality compute device 106 may or may not include the virtual reality output subsystem 138. Regardless, the virtual reality output subsystem 112 may include any type of devices and components for rendering virtual reality objects to an occupant of the vehicle 102. For example, in the illustrative embodiment, the virtual reality output subsystem 112 includes a display 160. The display 160 may be embodied as any type of display on which the rendered virtual reality media can be rendered. In some embodiments, the display 160 is incorporated in the vehicle 102. For example, in some embodiments, the display 160 may be embodied as a windshield or other window of the vehicle 102. Additionally, in embodiments utilizing augmented reality, the display 160 may be embodied as, or otherwise incorporated in, an independent screen or display device that allows the user to view the real-world environment within or outside the vehicle 102.

Of course, it should be appreciated that the rendered virtual reality media and/or motion-compensated virtual reality media may include output modalities in addition to, or instead of, visual virtual reality media including, for example, audio and tactile virtual reality modalities. As such, in some embodiments, the virtual reality output subsystem 112 may also include one or more other output devices configured to generate a virtual reality output, such as an audio output device 162 and a haptic output device 164. The audio output device 162 may be embodied as any type of device (e.g., a speaker) capable of rendering virtual reality media content that includes, or is otherwise embodied as, a sound. Similarly, the haptic output device 164 may be embodied as any type of output device capable of rendering virtual reality media content that includes, or is otherwise embodied as, haptic or tactile feedback. For example, the haptic output device 164 may be embodied as a rumble device. In this way, the virtual reality output subsystem 112 may provide render a virtual reality to the occupant that affects multiple senses of the occupant (e.g., visual, audible, touch, etc.). As such, it should be appreciated that the rendered virtual reality media and/or motion-compensated virtual reality media may include visual, audio, tactile, and/or other sensory output. For example, a bump detected by the vehicle sensors 108 may be rendered as via display state on the display 160, as an audible bump on the audio output device 162, and/or as a tactile bump via the haptic output device 164.

As discussed above, the system 100 may also include one or more user-worn sensors 114. The user-worn sensors 114, like the virtual reality sensors 130, are configured to generate the user context data indicative of a context of the occupant of the vehicle 102. The user context data may be used to determine how the user is reacting to the motion of the vehicle 102. Illustratively, the user-worn sensors 114 may include a motion sensor 170, a biometrics sensor 172, an image sensor 174, and/or an audio sensor 176 to generate the user context data. For example, the user-worn motion sensor 170 (e.g., a gyroscope or accelerometer) may generate or produce sensor data indicative of a motion of the occupant of the vehicle 102; the user-worn biometric sensor 172 (e.g., a heart rate monitor) may generate or produce sensor data indicative of a biometric of the occupant of the vehicle 102; the user-worn image sensor 174 (e.g., a camera) may generate or produce sensor data indicative of a facial expression of the occupant of the vehicle 102; and/or the user-worn audio sensor 176 (e.g., microphone) may generate or produced sensor data indicative of a voice of the occupant of the vehicle 102 to generate the user context data. Again, it should be appreciated that the user context data may be stored as a part of the historical user data, which may be analyzed to determine whether the virtual reality compute device 106 adequately modified and updated the virtual reality media content to compensate the motion of the vehicle 102 as discussed in more detail below. In some embodiments, the user-worn sensors 114 may be also be worn by other occupants of the vehicle 102 to detect the overall environmental changes of the vehicle 102.

It should be appreciated that, in some embodiments, the virtual reality output subsystem 112 and the user-worn sensors 114 may be incorporated in different devices. For example, in some embodiments, the user-worn sensors 114 may be incorporated in clothing of the occupant and the virtual reality output subsystem 112 may be incorporated in a windshield of the vehicle 102. In other embodiments, the virtual reality output subsystem 112 and the user-worn sensors 114 may be incorporated in, or form a portion of, a same device, for example, a pair of virtual reality goggles.

The network 104 may be embodied as any type of network capable of facilitating communications between multiple vehicles 102. For example, the network 104 may be embodied as, or otherwise include, a wireless local area network (LAN), a wireless wide area network (WAN), a cellular network, and/or a publicly-accessible, global network such as the Internet. As such, the network 104 may include any number of additional devices, such as additional computers, routers, and switches, to facilitate communications thereacross.

Figure 2:
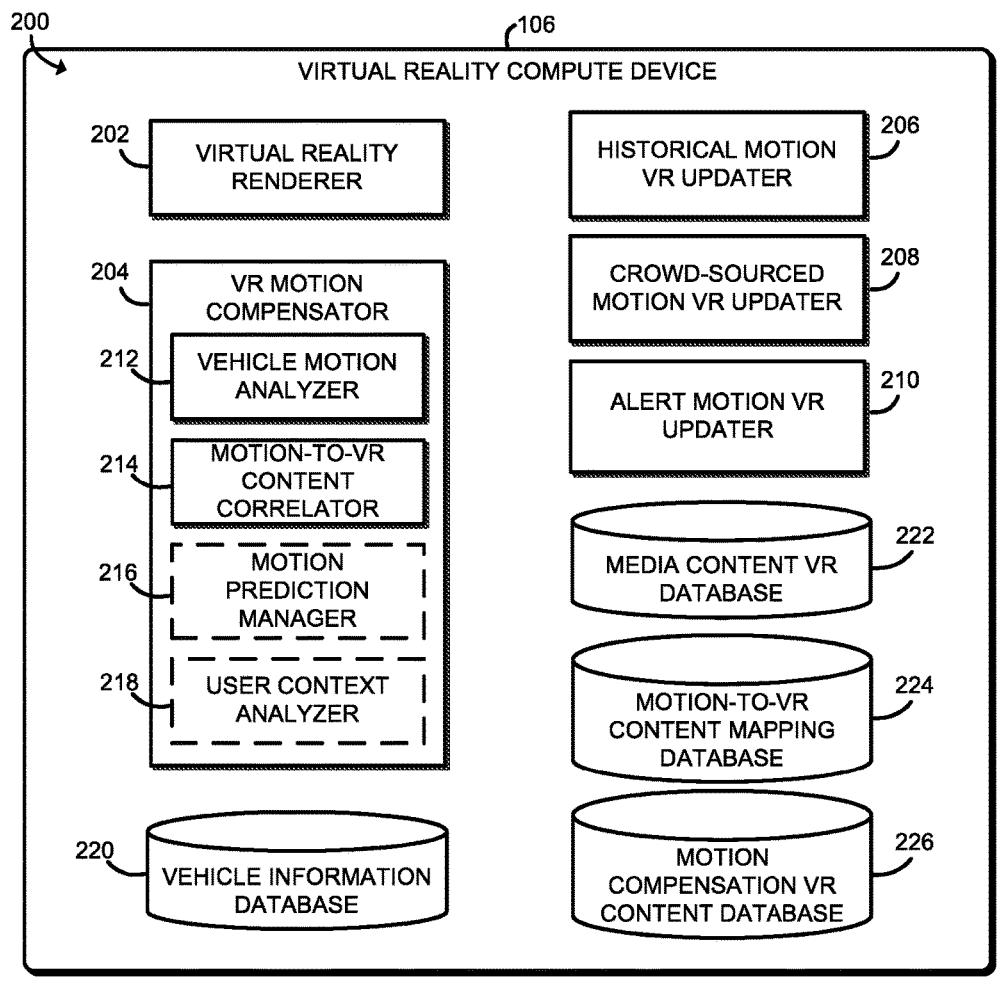
FIG. 2 is a simplified block diagram of at least one embodiment of an environment that may be established by a virtual reality compute device of the system of FIG. 1.

Referring now to FIG. 2, in the illustrative embodiments, the virtual reality compute device 106 may establish an environment 200 during operation. The illustrative environment 200 includes a virtual reality renderer 202, a virtual reality motion compensator 204, a historical motion virtual reality updater 206, a crowd-sourced motion virtual reality updater 208, and an alert virtual reality motion updater 210. The various components of the environment 200 may be embodied as hardware, firmware, software, or a combination thereof. As such, in some embodiments, one or more of the components of the environment 200 may be embodied as circuitry or collection of electrical devices (e.g., a virtual reality renderer circuit 202, a virtual reality motion compensator circuit 204, a historical motion virtual reality updater circuit 206, a crowd-sourced motion virtual reality updater circuit 208, an alert virtual reality motion updater circuit 210, etc.). It should be appreciated that, in such embodiments, one or more of the virtual reality renderer circuit 202, the virtual reality motion compensator circuit 204, the historical motion virtual reality updater circuit 206, the crowd-sourced motion virtual reality updater circuit 208, the alert virtual reality motion updater circuit 210, and/or other components of the virtual reality compute device 106. Additionally, in some embodiments, one or more of the illustrative components of the environment 200 may form a portion of another component and/or one or more of the illustrative components may be independent of one another. Further, in some embodiments, one or more of the components of the environment 200 may be embodied as virtualized hardware components or emulated architecture, which may be established and maintained by the processor 120 or other components of the virtual reality compute device 106.

The virtual reality renderer 202 is configured to render the virtual reality media content on a corresponding virtual reality output device of the vehicle 102 (e.g., the virtual reality output subsystem 112 or 138). The virtual reality media contents are stored in the virtual media content database 222. As discussed above, the virtual reality media content may be rendered on a heads-up display (e.g., windshield) of the vehicle 102 and/or on the standalone user-worn device.

The virtual reality motion compensator 204 is configured to modify the virtual reality media content based on a determined (or predicated) motion of the vehicle 102. To do so, the virtual reality motion compensator 204 includes a vehicle motion analyzer 212 and a motion-to-virtual reality content correlator 214. The vehicle motion analyzer 212 is configured to determine the motion of the vehicle 102 based on sensor data produced by the one or more vehicle motion sensors 150 of the vehicle. Additionally or alternatively, in some embodiments, the vehicle motion analyzer 212 may also analyze other data received from, for example, the vehicle navigation subsystem 110, user-worn sensors 114, and/or other sensors of virtual reality compute devices to determine or predict the motion of the vehicle 102. After determining the motion of the vehicle 102, the vehicle motion analyzer 212 may compare the determined motion of the vehicle to a reference threshold to determine whether to modify the rendered virtual reality media content (e.g., whether the severity of a turn requires virtual reality compensation).

The motion-to-virtual reality content correlator 214 is configured to determine motion compensation virtual reality content based on the determined motion of the vehicle 102. To do so, the motion-to-virtual reality content correlator 214 may compare the determined or predicted vehicle motion to a motion-to-virtual reality content mapping, which may be stored in a motion-to-virtual reality content mapping database 224. An illustrative motion-to-virtual reality content mapping 300 is shown in FIG. 3. The illustrative motion-to-virtual reality content mapping 300 includes the detected motion of the vehicle 102, a default virtual reality motion adjustment, and media indexed adjustment. For example, each detected motion of the vehicle 102 corresponds to a default virtual reality motion adjustment (i.e., an adjustment to the rendered virtual reality content). It should be appreciated that depending on the virtual reality media content, it may have a specific index adjustment. For example, if the virtual reality compute device 106 detects a left turn of the vehicle 102 based on sensor data from the vehicle motion sensors 150, the virtual reality compute device 106 may utilize the default virtual reality motion adjustment of "left turn" by modifying or updating the rendered virtual reality content to include the virtual reality effects of a left turn (e.g., even if the user has not controlled the content to produce a left turn). However, if the virtual reality compute device 106 is presently playing the "GAME A" content, the virtual reality compute device 106 may modify the presently rendered virtual reality media content to include a tilt toward the left side of the vehicle 102, instead of the default left turn, in response to a determination that the vehicle 102 is turning left. Alternatively, if the virtual reality compute device 106 is presently playing the "GAME B" content, the virtual reality compute device 106 may modify the presently rendered virtual reality media content to include a spin toward the left side of the vehicle 102, instead of the default left turn, in response to a determination that the vehicle 102 is turning left. In another example, if the virtual reality compute device 106 detects a road bump based on sensor data from the vehicle motion sensors 150, the default virtual reality motion is to modify the virtual reality media content to create turbulence (e.g., shaking). However, if the "GAME A" content is presently rendered by the virtual reality compute device 106, the virtual reality media content may be modified to display a video static on the display, instead of the turbulence. If, however, the "GAME B" content is presently rendered by the virtual reality compute device 106, the virtual reality media content may be modified to display a damaging hit by, for example, a meteorite, instead of creating the turbulence or the video static. In this way, the modification, updating, or change to the rendered virtual media content based on the motion of the vehicle may be based on or dictated by the particular virtual media content being rendered at the time at which the vehicle motion is experienced.

Referring back to FIG. 2, in some embodiments, the virtual reality motion compensator 204 may also include a motion prediction manger 216 and/or a user context analyzer 218. The motion prediction manger 216 is configured to predict the motion of the vehicle 102 based on the navigation data, the historical data, the crowd-sourced data, vehicle information, and/or any other data. As discussed above, the navigation data may be generated or provided by the vehicle navigation subsystem 110, the historical data may be captured or developed over time, and the crowd-sourced data may be objected from other vehicles, servers, or other devices. The vehicle information, however, may be stored in a vehicle information database 220 and may be embodied as any type of data that defines a characteristic of the vehicle 102. For example, the vehicle information may define the year, make, model, and/or Vehicle Identification Number (VIN). In some embodiments, the vehicle information may also include real-time information related to the vehicle, such as a speed at which the vehicle 102 is travelling and/or a condition of the road surface (e.g., downward slope, upward slope, or flat) on which the vehicle 102 is travelling.

The user context analyzer 218 is configured to monitor reactions of the user to determine if the modification of the virtual reality media content based on the determined motion of the vehicle 102 was successful in reducing user discomfort. As discussed above, the user context may include, but not limited to, the user's location, position, orientation, movement, gesture, expression, biometric, and/or voice of the user in the vehicle 102. The user context may indicate user's reaction or any discomfort, for example, nausea, experienced by the user. As discussed above, the user context may be based on sensor data from the user-worn sensors 114, the vehicle sensors 108, the virtual reality sensors 130, and/or other sensors and may be stored as a historical data.

The historical motion virtual reality updater 206 is configured to manage and update the historical motion data which may be used to predict the motion of the vehicle 102. For example, as the vehicle 102 travels over a roadway, the historical motion virtual reality updater 206 may record the vehicle motion sensed of that particular roadway to facilitate the predicting of vehicle motion when the vehicle 102 again travels over that particular roadway.

The crowd-sourced motion virtual reality updater 208 is configured to update the crowd-sourced motion data and may further update the motion-to-virtual reality content mapping or motion compensation virtual reality content based on the crowd-source motion data. As discussed above, the crowd-sourced motion data may be received from other vehicle 102 or other devices, such as a remote server. The crowd-sourced motion virtual reality updater 208 is also configured to transmit motion data sensed by the vehicle 102 to other vehicles.

The alert virtual reality motion updater 210 is configured to manage alert notifications received by the virtual reality compute device 106. Such alert notifications may be generated by the one or more motion sensors 150 of the vehicle 102 and/or received from other vehicles 102, servers, or other devices. The alert notifications may be indicative of the presence of a type of unexpected event or context that may affect the motion of the vehicle 102. For example, an alert notification may be received from another vehicle indicating that a pothole has developed on the roadway of the vehicle 102. In response, the virtual reality compute device 106 may predict a bumping motion of the vehicle and update or modify the rendered virtual reality content accordingly.

Figure 4:
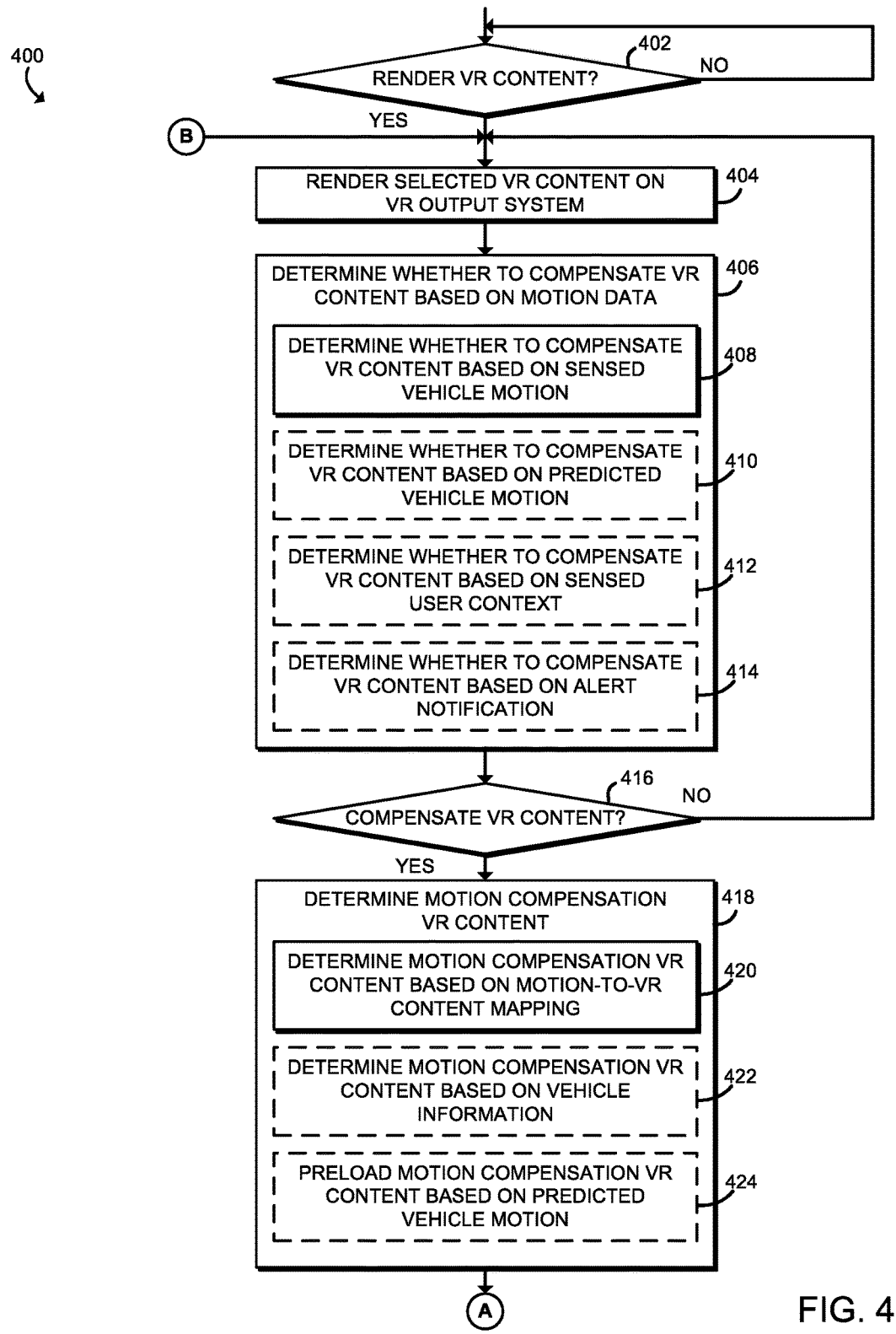
FIGS. 4-5 is a simplified flow diagram of at least one embodiment of a method for rendering motion-compensated virtual reality media that may be executed by the virtual reality compute device of FIGS. 1 and 2.
Figure 5:
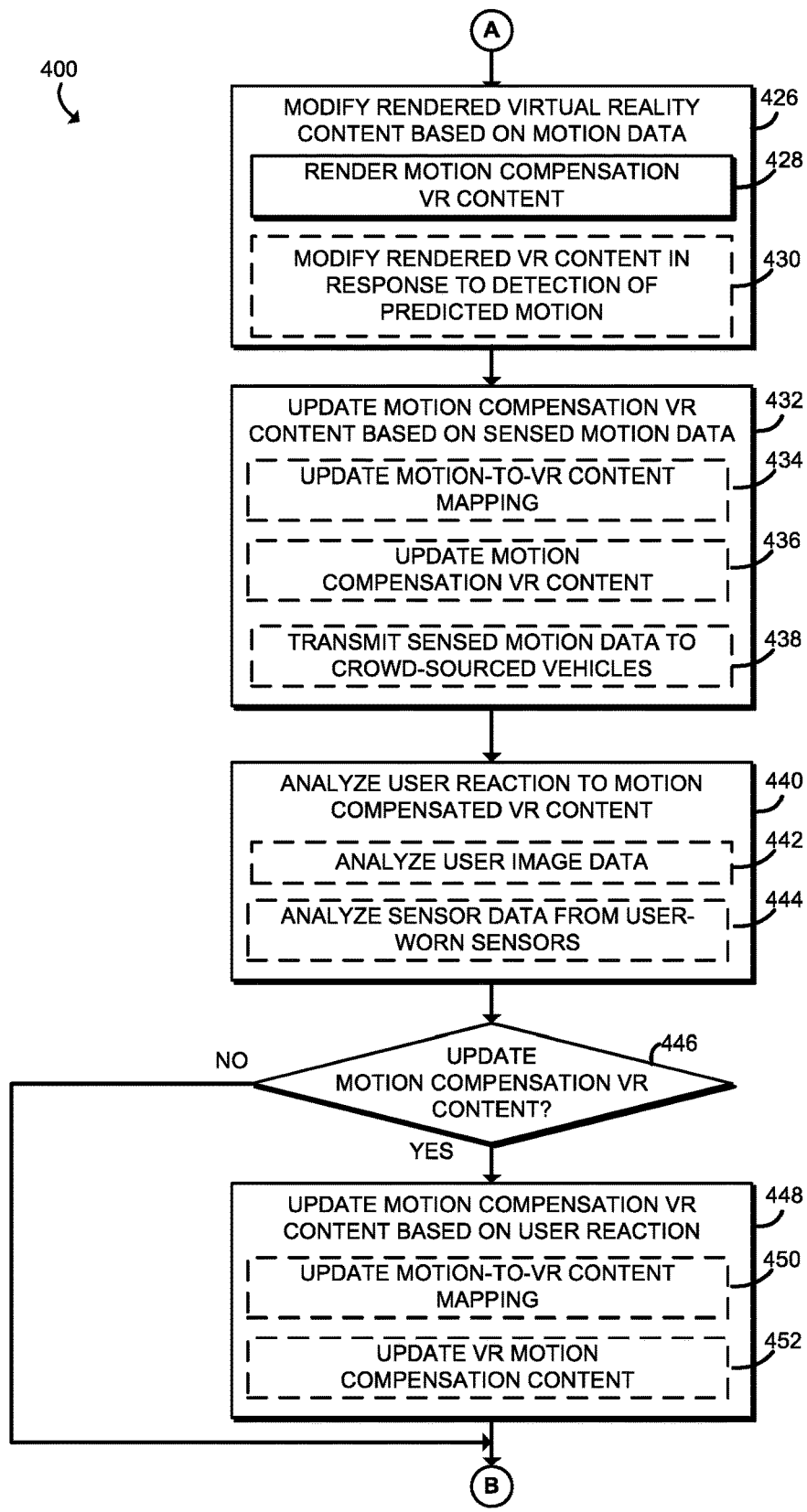

Referring now to FIGS. 4 and 5, in use, the virtual reality compute device 106 may execute a method 400 for rendering motion-compensated virtual reality media. The method 400 begins with block 402 in which the virtual reality compute device 106 determines whether to render virtual reality media content. If not, the method 400 loops back to block 402 to continue to monitor for a request to render virtual reality media content. If the virtual reality compute device 106 determines to render the virtual reality media content, the method 400 advances to block 404 in which the virtual reality compute device 106 renders the selected virtual reality media content on the virtual reality output subsystem 112, 138. In block 406, the virtual reality compute device 106 determines whether to compensate the virtual reality media content based on a motion data indicative of a present or predicted motion of the vehicle 102. In the illustrative embodiment, the motion data is, at least in part, based on the vehicle motion sensed by the one or more motion sensors 150 of the vehicle 102. For example, in block 408, the virtual reality compute device 106 determines whether to compensate the virtual reality media content based on a vehicle motion sensed by one or more vehicle motion sensors 150. To do so, the virtual reality compute device 106 may compare the vehicle motion sensed by the one or more vehicle motion sensors 150 to a reference threshold and modify the rendered virtual reality media content in response to a determination that the determined vehicle motion is greater than the reference threshold. In such embodiments, the virtual reality compute device 106 only modifies or updates the virtual reality media content only if the detected motion exceeds (or otherwise satisfies) the reference threshold. For example, if the vehicle motion sensors 150 generate sensor data indicating that the vehicle 102 is moving left, the virtual reality compute device 106 may compare that sensor data to a corresponding reference threshold to determine whether the degree or severity at which vehicle 102 is turning left would adversely affect the occupant of the vehicle 102. For example, the virtual reality compute device 106 may determine that the vehicle 102 is only slightly turning to the left (e.g., slowly changing the lane to the left) in a way that will not adversely affect the occupant of the vehicle 102.

Figure 6:
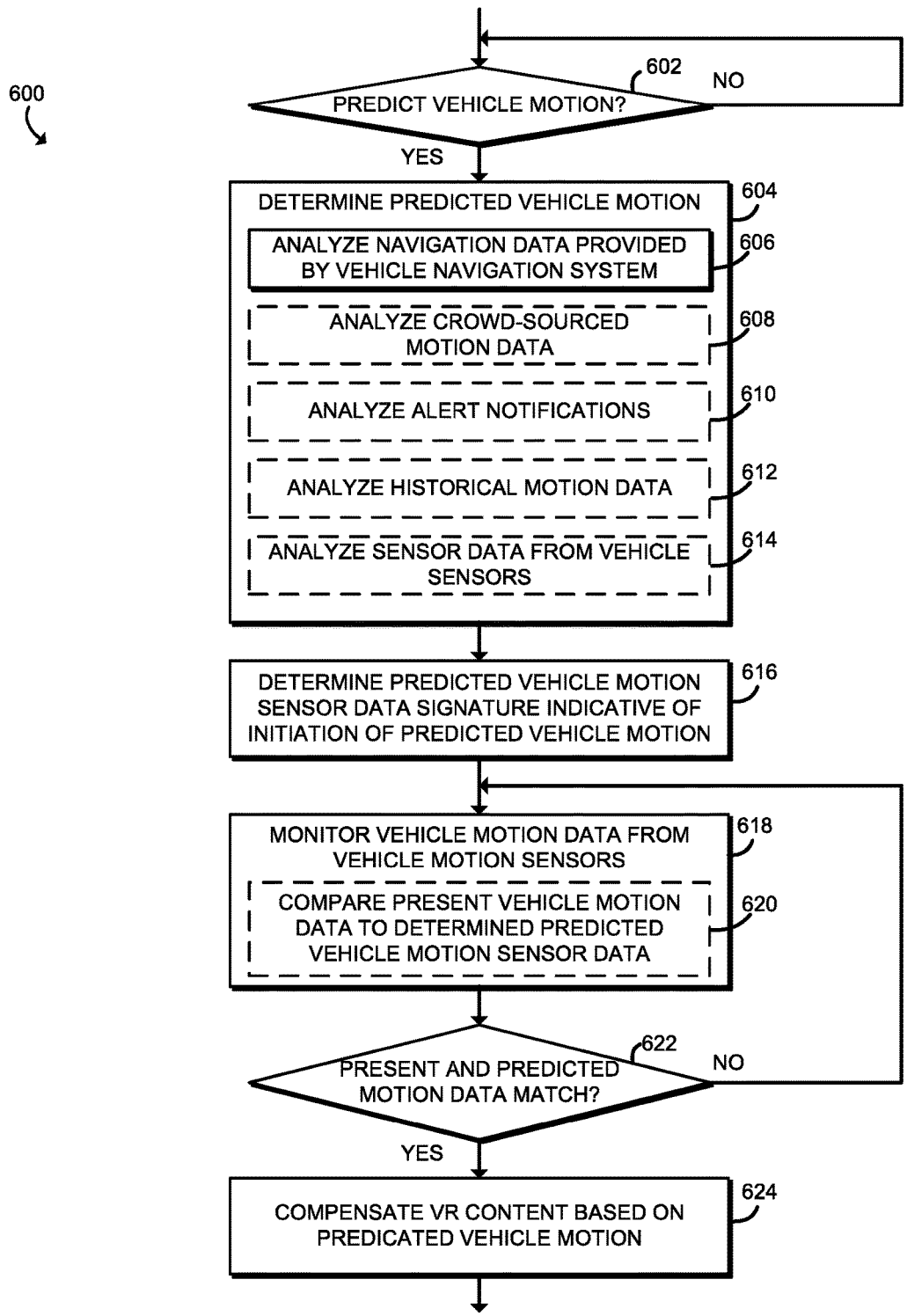
FIG. 6 is a simplified flow diagram of at least one embodiment of a method for predicting vehicle motion of a vehicle that may be executed by the virtual reality compute device of FIGS. 1 and 2.

As discussed above, the virtual reality compute device 106 may modify or update the rendered virtual reality media content based on real-time motion of the vehicle and/or predicted motion of the vehicle. As such, in some embodiments, in block 410, the virtual reality compute device 106 determines whether to compensate the virtual reality media content based on a predicted motion of the vehicle 102. A predicted motion of the vehicle 102 is a motion that has not yet been fully sensed by the vehicle 102 in real-time but is expected to be sensed in the future. To determine the predicted motion of the vehicle, the virtual reality compute device 106 may execute a method 600 for predicting the vehicle motion as shown in FIG. 6.

The method 600 begins with block 602 in which the virtual reality compute device 106 determines whether to predict the motion of the vehicle 102. If not, the method 600 loops back to block 602 to continue monitoring for a request to predict the motion of the vehicle 102 (e.g., to wait until sensor data is available). If the virtual reality compute device 106 determines to predict the vehicle motion, the method 600 advances to block 604 in which the virtual reality compute device 106 determines the predicted vehicle motion. To do so, the virtual reality compute device 106 may utilize any type of sensor data or other information to predict a motion of the vehicle 102. For example, in the illustrative embedment in block 606, the virtual reality compute device 106 analyzes the navigation data provided by the vehicle navigation subsystem 110, which may include a predicted travel path and/or traffic pattern associated with the predicted travel path.

Additionally, in some embodiment, in block 608, the virtual reality compute device 106 may analyze crowd-sourced motion data. As discussed above, the crow-sourced motion data is received from other vehicles and may include motion data indicative of the determined motion of other vehicles. For example, the crowd-sourced motion data may be indicative of the motion of the other vehicles as they traversed a portion of the roadway that the vehicle 102 is presently traversing. In some embodiments, in block 610, the virtual reality compute device 106 may also analyze alert notifications. As discussed above, the alert notifications may be generated by one more motion sensors 150 of the vehicle 102 or be received from other vehicles. Again, such alert notifications may provide notice to the virtual reality compute device 106 of unexpected events, structures, or context that may affect the vehicle's motion. Additionally, some embodiments in block 612, the virtual reality compute device 106 may analyze the historical motion data. The historical motion data includes a historical motion of the vehicle, which may be used to predict the motion of the vehicle 102. For example, the historical motion may relate to the same portion of roadway presently traveled by the vehicle 102. Further, in some embodiments in block 608, the virtual reality compute device 106 may also analyze the sensor data from the vehicle sensors 108. In such embodiments, the sensor data may be indicative of an upcoming change in the vehicle motion, may be used to predict a further motion of the vehicle 102.

In block 616, after the virtual reality compute device 106 determines the predicted vehicle motion, the virtual reality compute device 106 determines a predicted vehicle motion sensor data signature. The predicted vehicle motion sensor data signature is indicative of initiation of predicted vehicle motion. For example, if the virtual reality compute device 106 determines that the predicted motion of the vehicle 102 is an aggressive right-hand turn, the predicted vehicle motion sensor data signature may define the type and values of sensor data that is expected to be received from the vehicle sensors 108 at the start of the predicted aggressive right-hand turn. In this way, the virtual reality compute device 106 may predict the initiation of the predicted motion based on initial sensor data, which may reduce the latency at which the virtual reality compute device 106 modifies or otherwise compensates the rendered virtual reality media content for the predicted motion.

In block 618, the virtual reality compute device 106 monitors the vehicle motion data from the vehicle motion sensors 150, which indicates the present motion of the vehicle 102 as discussed above. For example, the virtual reality compute device 106 may compare the present vehicle motion data to the determined predicted vehicle motion sensor data signature in block 620. Subsequently, in block 622, the virtual reality compute device 106 determines whether the present motion data matches the predicted motion sensor data signature. If not, the method 600 loops back to block 618 in which the virtual reality compute device 106 continues to monitor the vehicle motion data. If, however, the virtual reality compute device 106 determines that the present and predicted motion data match, the method 600 advances to block 624 in which the virtual reality compute device 106 compensates the virtual reality media content based on the determined predicted vehicle motion (e.g., by preloading the motion compensation virtual reality content).

Referring back to FIG. 4, in some embodiments in block 412, the virtual reality compute device 106 may also determine whether to compensate the virtual reality media content based on sensed user context. As discussed above, the user context may include, but not limited to, the user's location, position, orientation, movement, gesture, expression, biometric, and/or voice of the user in the vehicle 102. The user context may indicate user's reaction or any discomfort, for example, nausea, experienced by the user. Additionally, in some embodiments, in block 414, the virtual reality compute device 106 determines whether to compensate the virtual reality media content based on sensed alert notification. As discussed above, the alert notification may be generated by one more motion sensors 150 of the vehicle 102 or may be received from one or more other vehicles.

If, in block 416, the virtual reality compute device 106 has determined not to compensate the rendered virtual reality content based on the motion of the vehicle 102, the method 400 loops back to block 404 in which the virtual reality compute device 106 continues to render a virtual reality media content on the virtual reality output subsystem 112, 138. If, however, the virtual reality compute device 106 determines to compensate the virtual reality content, the method 400 advances to step 418 in which the virtual reality compute device 106 determines the motion compensation virtual reality content to be used to compensate the presently rendered virtual reality content. To do so, the virtual reality compute device 106 determines the motion compensation virtual reality content based on a motion-to-virtual reality content mapping stored in the motion-to-virtual reality content mapping database 224 as discussed above.

Additionally or alternatively, in block 422, the virtual reality compute device 106 may determine the motion compensation virtual reality content based on the vehicle information stored in the vehicle information database 220. For example, the particular weight of the vehicle 102 may affect the particular type or degree of the motion compensation virtual reality content selected to modify the presently rendered virtual reality content. Additionally, as discussed above, the virtual reality compute device 106 may preload the selected motion compensation virtual reality content based on a predicated vehicle motion. Such preloading of motion compensation virtual reality content may reduce the latency at which the virtual reality compute device 106 compensates the presently rendered virtual reality content.

In block 426 of FIG. 5, the virtual reality compute device 106 modifies the rendered virtual reality content based on the determined motion data. It should be appreciated that the manner in which the virtual reality compute device 106 modifies the presently rendered virtual reality content may depend on the type of motion compensation virtual reality content selected in block 418. For example, in some embodiments in block 428, the virtual reality compute device 106 may render the selected motion compensation virtual reality content in addition to the presently rendered virtual reality content (e.g., by adding an explosion). In other embodiments, however, the virtual reality compute device 106 may modify or alter the presently rendered virtual reality content without adding additional content (e.g., by rotating or moving the presently displayed virtual reality objects). Additionally, as discussed above, the virtual reality compute device 106 may modify the presently rendered virtual reality content in response to detection of predicted motion of the vehicle 102 in block 430.

In block 432, the virtual reality compute device 106 updates the motion compensation virtual reality content based on the sensed motion data. For example, in block 434, the virtual reality compute device 106 may update the motion-to-virtual reality content mapping stored in the motion-to-virtual reality content mapping database 224 based on the sensed motion data. Additionally or alternatively, in block 436, the virtual reality compute device 106 may update the motion compensation virtual reality content stored in the motion compensation virtual reality content database 226 based on the sensed motion data. Further, in some embodiments in block 438, the virtual reality compute device 106 may transmit the sensed motion data to the crowd-sourced vehicles over the network 104.

In block 440, the virtual reality compute device 106 analyzes the user reaction to motion compensated virtual reality content to determine effectiveness of the motion compensated virtual reality content in reducing occupant discomfort. In some embodiments, in block 442, the virtual reality compute device 106 may analyze the user image data generated by the image sensor 134 of the vehicle sensors 108. Additionally or alternatively, in block 444, the virtual reality compute device 106 may analyze the sensor data from the user-worn sensors 114. As discussed above, the image sensor 134 and the user-worn sensors 114 are configured to provide, for example, location, position, orientation, movement, gesture and/or expression of the user which may in turn indicate user's reaction or any discomfort, for example, nausea, experienced by the user. The user-worn sensors 114 may further provide a biometrics of user which may also be used to determine any discomfort experienced by the user.

In block 446, the virtual reality compute device 106 determines whether to update the motion compensation virtual reality content. If so, the virtual reality compute device 106 updates the motion compensation virtual reality content based on the user reaction determined in block 440. For example, in block 450, the virtual reality compute device 106 may update the motion-to-virtual reality content mapping based on the occupant's reaction. Additionally or alternatively, in block 452, the virtual reality compute device 106 may update the motion compensated virtual reality content based on the occupant's reaction. In this way, the virtual reality compute device 106 may update and/or fine tune the modification of the rendered virtual reality content based on the motion of the vehicle and the reaction of the occupants. After the virtual reality compute device 106 has updated the motion compensation virtual reality content or if no updated is to be done, the method 400 loops back to block 404 of FIG. 4 in which the virtual reality compute device 106 continues to render a virtual reality media content on the virtual reality output subsystem 112, 138.

Figure 7:
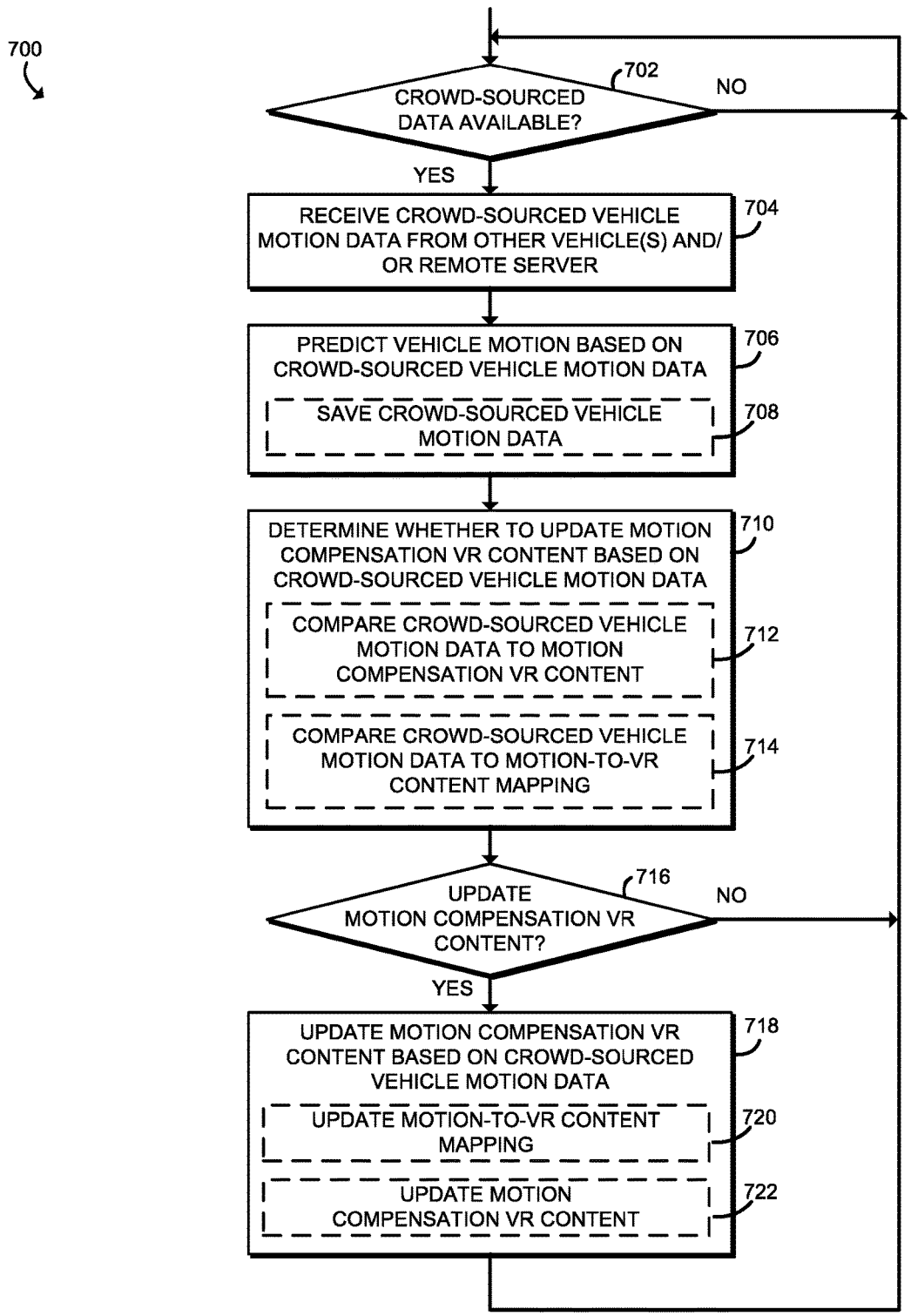
FIG. 7 is a simplified flow diagram of at least one embodiment of a method for updating motion compensation virtual reality content based on crowd-source data that may be executed by the virtual reality compute device of FIGS. 1 and 2.

Referring now to FIG. 7, in use, the virtual reality compute device 106 may execute a method 700 for updating motion compensation virtual reality content based on crowd-source data. The method 700 begins with block 702 in which the virtual reality compute device 106 determines whether the crowd-sourced data is available. If so, the method 700 advances to block 704 in which the virtual reality compute device 106 receives the crowd-sourced vehicle motion data from other vehicle(s), a remote server, and/or other device. In block 706, the virtual reality compute device 106 predicts the vehicle motion based on the crowd-sourced vehicle motion data. For example, as discussed above, the crowd-sourced vehicle motion data may indicate a geographical location of an event, structure, or context and the corresponding motion sensed by the other vehicle. The virtual reality compute device 106 may utilize the crowd-sourced vehicle motion data to predict the vehicle motion expected to be sensed by the vehicle 102 in the future as discussed above in regard to method 600. In some embodiments, in block 708, the virtual reality compute device 106 may save the crowd-sourced vehicle motion data.

In block 710, the virtual reality compute device 106 determines whether to update the motion compensation virtual reality content based on the crowd-sourced vehicle motion data. In some embodiments, in block 712, the virtual reality compute device 106 compares the crowd-sourced vehicle motion data to the motion compensation virtual reality content based, at least in part, on the determined motion of the vehicle. In some embodiments, in block 714, the virtual reality compute device 106 compares the crowd-sourced vehicle motion data to the motion-to-virtual reality content mapping to determine the desired modification of the virtual reality media content based on the crowd-sourced vehicle motion data.

In block 716, the virtual reality compute device 106 determines whether to update the motion compensation virtual reality content. If not, the method 700 loops back to block 702 in which the virtual reality compute device 106 determines whether new crowd-sourced data is available. If, however, the virtual reality compute device 106 determines to update the motion compensation virtual reality content, the method 700 advances to block 718 in which the virtual reality compute device 106 updates the motion compensation virtual reality content based on the crowd-sourced vehicle motion data. In some embodiments, in block 720, the virtual reality compute device 106 updates the motion-to-virtual reality content mapping. Additionally or alternatively, in block 722, the virtual reality compute device 106 may update the motion compensation virtual reality content.

EXAMPLES

Illustrative examples of the technologies disclosed herein are provided below. An embodiment of the technologies may include any one or more, and any combination of, the examples described below.

Example 1 includes a virtual reality compute device of a vehicle, the virtual reality compute device comprising a virtual reality renderer to render virtual reality content to an occupant of the vehicle; and a virtual reality motion compensator to (i) determine a motion of the vehicle based at least on sensor data generated by one or more vehicle motion sensors of the vehicle and (ii) modify the rendered virtual reality media based on the determined motion of the vehicle.

Example 2 includes the subject matter of Example 1, and wherein to render virtual reality content comprises to render the virtual reality content on a virtual reality output system of the vehicle.

Example 3 includes the subject matter of any of Examples 1 and 2, and wherein to render virtual reality content comprises to render the virtual reality content on a virtual reality output system of a user-worn compute device.

Example 4 includes the subject matter of any of Examples 1-3, and wherein to determine the motion of the vehicle comprises to determine the motion of the vehicle based on sensor data produced by one or more vehicle motion sensors of the vehicle.

Example 5 includes the subject matter of any of Examples 1-4, and wherein to determine the motion of the vehicle further comprises to determine the motion of the vehicle based on a predicted motion of the vehicle.

Example 6 includes the subject matter of any of Examples 1-5, and wherein to determine the motion of the vehicle based on the predicted motion of the vehicle comprises to access navigation data provided by a vehicle navigation system of the vehicle, and to predict a motion of the vehicle based on the accessed navigation data.

Example 7 includes the subject matter of any of Examples 1-6, and wherein to determine the motion of the vehicle based on the predicted motion of the vehicle comprises to predict a motion of the vehicle based on sensor data produced by one or more vehicle motion sensors of the vehicle.

Example 8 includes the subject matter of any of Examples 1-7, and wherein to determine the motion of the vehicle based on the predicted motion of the vehicle comprises to predict a motion of the vehicle based on crowd-sourced motion data received from another vehicle.

Example 9 includes the subject matter of any of Examples 1-8, and wherein to determine the motion of the vehicle based on the predicted motion of the vehicle comprises to predict a motion of the vehicle based on an alert notification received by the virtual reality compute device.

Example 10 includes the subject matter of any of Examples 1-9, and wherein the alert notification comprises an alert notification generated by one or more vehicle motion sensors of the vehicle.

Example 11 includes the subject matter of any of Examples 1-10, and wherein to predict the motion of the vehicle comprises to predict a motion of the vehicle based on an alert notification received from another vehicle.

Example 12 includes the subject matter of any of Examples 1-11, and wherein to determine the motion of the vehicle based on the predicted vehicle motion comprises to predict a motion of the vehicle based on historical motion data indicative of a historical motion of the vehicle.

Example 13 includes the subject matter of any of Examples 1-12, and wherein to determine the motion of the vehicle comprises (i) to determine a present motion of the vehicle and (ii) to determine a vehicle motion sensor data signature indicative of the initiation of a predicted vehicle motion; and to modify the rendered virtual reality media comprises to modify the rendered virtual reality media in response to a determination that the determined present motion of the vehicle matches the vehicle motion sensor data signature.

Example 14 includes the subject matter of any of Examples 1-13, and wherein to determine the motion of the vehicle further comprises to receive, by the virtual reality compute device and from one or more user-worn sensors, user context data indicative of a context of an occupant of the vehicle; and determine the motion of the vehicle based on the user context data.

Example 15 includes the subject matter of any of Examples 1-14, and wherein to receive the user context data comprises to receive the user context data indicative of a motion of the occupant from a user-worn motion sensor.

Example 16 includes the subject matter of any of Examples 1-15, and wherein to receive the user context data comprises to receive the user context data indicative of a biometric of the occupant from a user-worn biometric sensor.

Example 17 includes the subject matter of any of Examples 1-16, and wherein to receive the user context data comprises to receive the user context data indicative of a facial expression of the occupant from a user-worn image sensor.

Example 18 includes the subject matter of any of Examples 1-17, and wherein to receive the user context data comprises to receive the user context data indicative of a voice of the occupant from a user-worn audio sensor.

Example 19 includes the subject matter of any of Examples 1-18, and wherein to determine the motion of the vehicle further comprises to determine the motion of the vehicle based on one or more alert notifications generated by one or more vehicle motion sensors of the vehicle.

Example 20 includes the subject matter of any of Examples 1-19, and wherein to determine the motion of the vehicle further comprises to receive one or more alert notification from another vehicle.

Example 21 includes the subject matter of any of Examples 1-20, and wherein to modify the rendered virtual reality media content comprises to compare the determination motion of the vehicle to a reference threshold; and modify the rendered virtual reality media content in response to a determination that the determined motion of the vehicle satisfies is greater than the reference threshold.

Example 22 includes the subject matter of any of Examples 1-21, and wherein to modify the rendered virtual reality media content comprises to determine motion compensation virtual reality content based on the determined motion of the vehicle; and modify the rendered virtual reality media content based on the determined motion compensation virtual reality content.

Example 23 includes the subject matter of any of Examples 1-22, and further including a motion-to-virtual reality content mapping database having stored therein a motion-to-virtual reality content mapping that maps vehicle motion to motion compensation virtual reality content, and wherein to determine the motion compensation virtual reality content comprises to determine the motion compensation virtual reality content by comparing the determined motion of the vehicle to the motion-to-virtual reality content mapping.

Example 24 includes the subject matter of any of Examples 1-23, and further including an updater configured to update the motion-to-virtual reality content mapping based on the determined motion of the vehicle.

Example 25 includes the subject matter of any of Examples 1-24, and wherein to determine motion compensation virtual reality content comprises to determine motion compensation virtual reality content based on vehicle information of the vehicle, wherein the vehicle information defines a characteristic of the vehicle.

Example 26 includes the subject matter of any of Examples 1-25, and wherein to determine motion compensation virtual reality content comprises to determine motion compensation virtual reality content based on a predicted motion of the vehicle.

Example 27 includes the subject matter of any of Examples 1-26, and wherein to modify the rendered virtual reality media content comprises to render the motion compensation virtual reality content.

Example 28 includes the subject matter of any of Examples 1-27, and further including an updater configured to update the motion compensation virtual reality content based on the determined motion of the vehicle.

Example 29 includes the subject matter of any of Examples 1-28, and further including a communications system configured to transmit motion data indicative of the determined motion of the vehicle to another vehicle.

Example 30 includes the subject matter of any of Examples 1-29, and further including a user context analyzer configured to determine a reaction of an occupant of the vehicle to the modified rendered virtual reality media content; and an updater configured to update the motion compensation virtual reality content based on the determined reaction of the occupant.

Example 31 includes the subject matter of any of Examples 1-30, and wherein to determine the reaction of the occupant comprises to determine the reaction of the occupant from an image of the occupant.

Example 32 includes the subject matter of any of Examples 1-31, and wherein to determine the reaction of the occupant comprises to determine the reaction of the occupant based on sensor data received from a user-worn sensor of the occupant.

Example 33 includes a method for rendering virtual reality media, the method comprising rendering, by a virtual reality compute device of a vehicle, a virtual reality content to an occupant of the vehicle; determining, by the virtual reality compute device, a motion of the vehicle based at least on sensor data generated by one or more vehicle motion sensors of the vehicle; and modifying, by the virtual reality compute device, the rendered virtual reality media based on the determined motion of the vehicle.

Example 34 includes the subject matter of Example 33, and wherein rendering virtual reality content comprises rendering the virtual reality content on a virtual reality output system of the vehicle.

Example 35 includes the subject matter of any of Examples 33 and 34, and wherein rendering virtual reality content comprises rendering the virtual reality content on a virtual reality output system of a user-worn compute device.

Example 36 includes the subject matter of any of Examples 33-35, and wherein determining the motion of the vehicle comprises determining the motion of the vehicle based on sensor data produced by one or more vehicle motion sensors of the vehicle.

Example 37 includes the subject matter of any of Examples 33-36, and wherein determining the motion of the vehicle further comprises determining the motion of the vehicle based on a predicted motion of the vehicle.

Example 38 includes the subject matter of any of Examples 33-37, and wherein determining the motion of the vehicle based on the predicted motion of the vehicle comprises accessing navigation data provided by a vehicle navigation system of the vehicle, and predicting a motion of the vehicle based on the accessed navigation data.

Example 39 includes the subject matter of any of Examples 33-38, and wherein determining the motion of the vehicle based on the predicted motion of the vehicle comprises predicting a motion of the vehicle based on sensor data produced by one or more vehicle motion sensors of the vehicle.

Example 40 includes the subject matter of any of Examples 33-39, and wherein determining the motion of the vehicle based on the predicted motion of the vehicle comprises predicting a motion of the vehicle based on crowd-sourced motion data received from another vehicle.

Example 41 includes the subject matter of any of Examples 33-40, and wherein determining the motion of the vehicle based on the predicted motion of the vehicle comprises predicting a motion of the vehicle based on an alert notification received by the virtual reality compute device.

Example 42 includes the subject matter of any of Examples 33-41, and, wherein the alert notification comprise an alert notification generated by one or more vehicle motion sensors of the vehicle.

Example 43 includes the subject matter of any of Examples 33-42, and wherein predicting the motion of the vehicle comprise predicting a motion of the vehicle based on an alert notification received from another vehicle.

Example 44 includes the subject matter of any of Examples 33-43, and wherein determining the motion of the vehicle based on the predicted vehicle motion comprises predicting a motion of the vehicle based on historical motion data indicative of a historical motion of the vehicle.

Example 45 includes the subject matter of any of Examples 33-44, and wherein determining the motion of the vehicle comprises (i) determining a present motion of the vehicle and (ii) determining a vehicle motion sensor data signature indicative of the initiation of a predicted vehicle motion; and modifying the rendered virtual reality media comprises modifying the rendered virtual reality media in response to a determination that the determined present motion of the vehicle matches the vehicle motion sensor data signature.

Example 46 includes the subject matter of any of Examples 33-45, and wherein determining the motion of the vehicle further comprises receiving, by the virtual reality compute device and from one or more user-worn sensors, user context data indicative of a context of an occupant of the vehicle; and determining the motion of the vehicle based on the context data.

Example 47 includes the subject matter of any of Examples 33-46, and wherein receiving the user context data comprises receiving the user context data indicative of a motion of the occupant from a user-worn motion sensor.

Example 48 includes the subject matter of any of Examples 33-47, and wherein receiving the user context data comprises receiving the user context data indicative of a biometric of the occupant from a user-worn biometric sensor.

Example 49 includes the subject matter of any of Examples 33-48, and wherein receiving the user context data comprises receiving the user context data indicative of a facial expression of the occupant from a user-worn image sensor.

Example 50 includes the subject matter of any of Examples 33-49, and wherein receiving the user context data comprises receiving the user context data indicative of a voice of the occupant from a user-worn audio sensor.

Example 51 includes the subject matter of any of Examples 33-50, and wherein determining the motion of the vehicle further comprises determining the motion of the vehicle based on one or more alert notifications generated by one or more vehicle motion sensors of the vehicle.

Example 52 includes the subject matter of any of Examples 33-51, and wherein determining the motion of the vehicle further comprises receiving one or more alert notification from another vehicle.

Example 53 includes the subject matter of any of Examples 33-52, and wherein modifying the rendered virtual reality media content comprises comparing the determination motion of the vehicle to a reference threshold; and modifying the rendered virtual reality media content in response to a determination that the determined motion of the vehicle satisfies is greater than the reference threshold.

Example 54 includes the subject matter of any of Examples 33-53, and wherein modifying the rendered virtual reality media content comprises determining motion compensation virtual reality content based on the determined motion of the vehicle; and modifying the rendered virtual reality media content based on the determined motion compensation virtual reality content.

Example 55 includes the subject matter of any of Examples 33-54, and wherein determining the motion compensation virtual reality content comprises determining the motion compensation virtual reality content by comparing the determined motion of the vehicle to a motion-to-virtual reality content mapping, wherein the motion-to-virtual reality content mapping maps vehicle motion to motion compensation virtual reality content.

Example 56 includes the subject matter of any of Examples 33-55, and further including updating, by the virtual reality compute device, the motion-to-virtual reality content mapping based on the determined motion of the vehicle.

Example 57 includes the subject matter of any of Examples 33-56, and wherein determining motion compensation virtual reality content comprises determining motion compensation virtual reality content based on vehicle information of the vehicle, wherein the vehicle information defines a characteristic of the vehicle.

Example 58 includes the subject matter of any of Examples 33-57, and wherein determining motion compensation virtual reality content comprises determining motion compensation virtual reality content based on a predicted motion of the vehicle.

Example 59 includes the subject matter of any of Examples 33-58, and wherein modifying the rendered virtual reality media content comprises rendering the motion compensation virtual reality content.

Example 60 includes the subject matter of any of Examples 33-59, and further including updating, by the virtual reality compute device, the motion compensation virtual reality content based on the determined motion of the vehicle.

Example 61 includes the subject matter of any of Examples 33-60, and further including transmitting, by the virtual reality compute device, motion data indicative of the determined motion of the vehicle to another vehicle.

Example 62 includes the subject matter of any of Examples 33-61, and further including determining, by the virtual reality compute device, a reaction of an occupant of the vehicle to the modified rendered virtual reality media content; and updating, by the virtual reality compute device, the motion compensation virtual reality content based on the determined reaction of the occupant.

Example 63 includes the subject matter of any of Examples 33-62, and wherein determining the reaction of the occupant comprises determining the reaction of the occupant from an image of the occupant.

Example 64 includes the subject matter of any of Examples 33-63, and wherein determining the reaction of the occupant comprises determining the reaction of the occupant based on sensor data received from a user-worn sensor of the occupant.

Example 65 includes one or more machine-readable storage media comprising a plurality of instructions stored thereon that, when executed, causes a compute device to perform the method of any of Examples 33-64.

Example 66 includes a virtual reality compute device of a vehicle, the virtual reality compute device comprising means for rendering a virtual reality content to an occupant of the vehicle; means for determining a motion of the vehicle based at least on sensor data generated by one or more vehicle motion sensors of the vehicle; and means for modifying the rendered virtual reality media based on the determined motion of the vehicle.

Example 67 includes the subject matter of Example 66, and wherein the means for rendering virtual reality content comprises means for rendering the virtual reality content on a virtual reality output system of the vehicle.

Example 68 includes the subject matter of any of Examples 66 and 67, and wherein the means for rendering virtual reality content comprises means for rendering the virtual reality content on a virtual reality output system of a user-worn compute device.

Example 69 includes the subject matter of any of Examples 66-68, and wherein the means for determining the motion of the vehicle comprises means for determining the motion of the vehicle based on sensor data produced by one or more vehicle motion sensors of the vehicle.

Example 70 includes the subject matter of any of Examples 66-69, and wherein the means for determining the motion of the vehicle further comprises means for determining the motion of the vehicle based on a predicted motion of the vehicle.

Example 71 includes the subject matter of any of Examples 66-70, and wherein the means for determining the motion of the vehicle based on the predicted motion of the vehicle comprises means for accessing navigation data provided by a vehicle navigation system of the vehicle, and means for predicting a motion of the vehicle based on the accessed navigation data.

Example 72 includes the subject matter of any of Examples 66-71, and wherein the means for determining the motion of the vehicle based on the predicted motion of the vehicle comprises means for predicting a motion of the vehicle based on sensor data produced by one or more vehicle motion sensors of the vehicle.

Example 73 includes the subject matter of any of Examples 66-72, and wherein the means for determining the motion of the vehicle based on the predicted motion of the vehicle comprises means for predicting a motion of the vehicle based on crowd-sourced motion data received from another vehicle.

Example 74 includes the subject matter of any of Examples 66-73, and wherein the means for determining the motion of the vehicle based on the predicted motion of the vehicle comprises means for predicting a motion of the vehicle based on an alert notification received by the virtual reality compute device.

Example 75 includes the subject matter of any of Examples 66-74, and wherein the alert notification comprise an alert notification generated by one or more vehicle motion sensors of the vehicle.

Example 76 includes the subject matter of any of Examples 66-75, and wherein the means for predicting the motion of the vehicle comprise means for predicting a motion of the vehicle based on an alert notification received from another vehicle.

Example 77 includes the subject matter of any of Examples 66-76, and wherein the means for determining the motion of the vehicle based on the predicted vehicle motion comprises means for predicting a motion of the vehicle based on historical motion data indicative of a historical motion of the vehicle.

Example 78 includes the subject matter of any of Examples 66-77, and wherein the means for determining the motion of the vehicle comprises (i) means for determining a present motion of the vehicle and (ii) means for determining a vehicle motion sensor data signature indicative of the initiation of a predicted vehicle motion; and the means for modifying the rendered virtual reality media comprises means for modifying the rendered virtual reality media in response to a determination that the determined present motion of the vehicle matches the vehicle motion sensor data signature.

Example 79 includes the subject matter of any of Examples 66-78, and wherein the means for determining the motion of the vehicle further comprises means for receiving, from one or more user-worn sensors, user context data indicative of a context of an occupant of the vehicle; and means for determining the motion of the vehicle based on the context data.

Example 80 includes the subject matter of any of Examples 66-79, and wherein the means for receiving the user context data comprises means for receiving the user context data indicative of a motion of the occupant from a user-worn motion sensor.

Example 81 includes the subject matter of any of Examples 66-80, and wherein the means for receiving the user context data comprises means for receiving the user context data indicative of a biometric of the occupant from a user-worn biometric sensor.

Example 82 includes the subject matter of any of Examples 66-81, and wherein the means for receiving the user context data comprises means for receiving the user context data indicative of a facial expression of the occupant from a user-worn image sensor.

Example 83 includes the subject matter of any of Examples 66-82, wherein the means for receiving the user context data comprises means for receiving the user context data indicative of a voice of the occupant from a user-worn audio sensor.

Example 84 includes the subject matter of any of Examples 66-83, and wherein the means for determining the motion of the vehicle further comprises means for determining the motion of the vehicle based on one or more alert notifications generated by one or more vehicle motion sensors of the vehicle.

Example 85 includes the subject matter of any of Examples 66-84, and wherein the means for determining the motion of the vehicle further comprises means for receiving one or more alert notification from another vehicle.

Example 86 includes the subject matter of any of Examples 66-85, and wherein the means for modifying the rendered virtual reality media content comprises means for comparing the determination motion of the vehicle to a reference threshold; and means for modifying the rendered virtual reality media content in response to a determination that the determined motion of the vehicle satisfies is greater than the reference threshold.

Example 87 includes the subject matter of any of Examples 66-86, and wherein the means for modifying the rendered virtual reality media content comprises means for determining motion compensation virtual reality content based on the determined motion of the vehicle; and means for modifying the rendered virtual reality media content based on the determined motion compensation virtual reality content.

Example 88 includes the subject matter of any of Examples 66-87, and wherein the means for determining the motion compensation virtual reality content comprises means for determining the motion compensation virtual reality content by comparing the determined motion of the vehicle to a motion-to-virtual reality content mapping, wherein the motion-to-virtual reality content mapping maps vehicle motion to motion compensation virtual reality content.

Example 89 includes the subject matter of any of Examples 66-88, and further including means for updating the motion-to-virtual reality content mapping based on the determined motion of the vehicle.

Example 90 includes the subject matter of any of Examples 66-89, and wherein the means for determining motion compensation virtual reality content comprises means for determining motion compensation virtual reality content based on vehicle information of the vehicle, wherein the vehicle information defines a characteristic of the vehicle.

Example 91 includes the subject matter of any of Examples 66-90, and wherein the means for determining motion compensation virtual reality content comprises means for determining motion compensation virtual reality content based on a predicted motion of the vehicle.

Example 92 includes the subject matter of any of Examples 66-91, and wherein the means for modifying the rendered virtual reality media content comprises means for rendering the motion compensation virtual reality content.

Example 93 includes the subject matter of any of Examples 66-92, and, further including means for updating the motion compensation virtual reality content based on the determined motion of the vehicle.

Example 94 includes the subject matter of any of Examples 66-93, and further including means for transmitting motion data indicative of the determined motion of the vehicle to another vehicle.

Example 95 includes the subject matter of any of Examples 66-94, and further including means for determining a reaction of an occupant of the vehicle to the modified rendered virtual reality media content; and means for updating the motion compensation virtual reality content based on the determined reaction of the occupant.

Example 96 includes the subject matter of any of Examples 66-95, and wherein the means for determining the reaction of the occupant comprises means for determining the reaction of the occupant from an image of the occupant.

Example 97 includes the subject matter of any of Examples 66-96, and wherein the means for determining the reaction of the occupant comprises means for determining the reaction of the occupant based on sensor data received from a user-worn sensor of the occupant.

The invention claimed is:
1. A virtual reality compute device of a vehicle, the virtual reality compute device comprising:

a motion-to-virtual reality content mapping database having stored therein a motion-to-virtual reality content mapping that maps vehicle motion to motion compensation virtual reality content
a virtual reality renderer to render virtual reality content to an occupant of the vehicle; and
a virtual reality motion compensator to (i) determine a motion of the vehicle based at least on sensor data generated by one or more vehicle motion sensors of the vehicle; (ii) compare the determined motion of the vehicle to the motion-to-virtual reality content mapping to determine corresponding motion compensation virtual reality content; and (iii) modify the rendered virtual reality media based on the determined motion compensation virtual reality content.

2. The virtual reality compute device of claim 1, wherein to determine the motion of the vehicle comprises to determine the motion of the vehicle based on sensor data produced by one or more vehicle motion sensors of the vehicle.

3. The virtual reality compute device of claim 1, wherein to determine the motion of the vehicle further comprises to determine the motion of the vehicle based on a predicted motion of the vehicle.

4. The virtual reality compute device of claim 3, wherein to determine the motion of the vehicle based on the predicted motion of the vehicle comprises:
to access navigation data provided by a vehicle navigation system of the vehicle, and
to predict a motion of the vehicle based on the accessed navigation data.

5. The virtual reality compute device of claim 3, wherein to determine the motion of the vehicle based on the predicted vehicle motion comprises to predict a motion of the vehicle based on historical motion data indicative of a historical motion of the vehicle.

6. The virtual reality compute device of claim 1, wherein:
to determine the motion of the vehicle comprises (i) to determine a present motion of the vehicle and (ii) to determine a vehicle motion sensor data signature indicative of the initiation of a predicted vehicle motion; and
to modify the rendered virtual reality media comprises to modify the rendered virtual reality media in response to a determination that the determined present motion of the vehicle matches the vehicle motion sensor data signature.

7. The virtual reality compute device of claim 1, wherein to modify the rendered virtual reality media content comprises to:
compare the determined motion of the vehicle to a reference threshold; and
modify the rendered virtual reality media content in response to a determination that the determined motion of the vehicle satisfies is greater than the reference threshold.

8. A method for rendering virtual reality media, the method comprising:
rendering, by a virtual reality compute device of a vehicle, a virtual reality content to an occupant of the vehicle;
determining, by the virtual reality compute device, a motion of the vehicle based at least on sensor data generated by one or more vehicle motion sensors of the vehicle;
comparing, by the virtual reality compute device, the determined motion of the vehicle to a motion-to-virtual reality content mapping stored in motion-to-virtual reality content mapping database to determine a motion compensation virtual reality content, wherein the motion-to-virtual reality content mapping maps vehicle motion to motion compensation virtual reality content; and
modifying, by the virtual reality compute device, the rendered virtual reality media content based on the determined motion compensation virtual reality content.

9. The method of claim 8, wherein determining the motion of the vehicle comprises determining the motion of the vehicle based on sensor data produced by one or more vehicle motion sensors of the vehicle.

10. The method of claim 8, wherein determining the motion of the vehicle further comprises determining the motion of the vehicle based on a predicted motion of the vehicle.

11. The method of claim 10, wherein determining the motion of the vehicle based on the predicted motion of the vehicle comprises:
accessing navigation data provided by a vehicle navigation system of the vehicle, and
predicting a motion of the vehicle based on the accessed navigation data.

12. The method of claim 10, wherein determining the motion of the vehicle based on the predicted vehicle motion comprises predicting a motion of the vehicle based on historical motion data indicative of a historical motion of the vehicle.

13. The method of claim 8, wherein:
determining the motion of the vehicle comprises (i) determining a present motion of the vehicle and (ii) determining a vehicle motion sensor data signature indicative of the initiation of a predicted vehicle motion; and
modifying the rendered virtual reality media comprises modifying the rendered virtual reality media in response to a determination that the determined present motion of the vehicle matches the vehicle motion sensor data signature.

14. The method of claim 8, wherein modifying the rendered virtual reality media content comprises:
comparing the determination motion of the vehicle to a reference threshold; and
modifying the rendered virtual reality media content in response to a determination that the determined motion of the vehicle satisfies is greater than the reference threshold.

15. One or more non-transitory, machine-readable storage media comprising a plurality of instructions stored thereon that, when executed, causes a virtual reality compute device to:
render a virtual reality content to an occupant of the vehicle;
determine a motion of the vehicle based at least on sensor data generated by one or more vehicle motion sensors of the vehicle;
compare the determined motion of the vehicle to a motion-to-virtual reality content mapping stored in motion-to-virtual reality content mapping database to determine a motion compensation virtual reality content, wherein the motion-to-virtual reality content mapping maps vehicle motion to motion compensation virtual reality content; and
modify the rendered virtual reality media content based on the determined motion compensation virtual reality content.

16. The one or more non-transitory, machine-readable storage media of claim 15, wherein to determine the motion of the vehicle comprises to determine the motion of the vehicle based on sensor data produced by one or more vehicle motion sensors of the vehicle.

17. The one or more non-transitory, machine-readable storage media of claim 15, wherein to determine the motion of the vehicle further comprises to determine the motion of the vehicle based on a predicted motion of the vehicle.

18. The one or more non-transitory, machine-readable storage media of claim 17, wherein to determine the motion of the vehicle based on the predicted motion of the vehicle comprises to:
 access navigation data provided by a vehicle navigation system of the vehicle, and
 predict a motion of the vehicle based on the accessed navigation data.

19. The one or more non-transitory machine-readable storage media of claim 17, wherein to determine the motion of the vehicle based on the predicted vehicle motion comprises to predict a motion of the vehicle based on historical motion data indicative of a historical motion of the vehicle.

20. The one or more non-transitory, machine-readable storage media of claim 15, wherein to:
 determine the motion of the vehicle comprises to (i) determine a present motion of the vehicle and (ii) determine a vehicle motion sensor data signature indicative of the initiation of a predicted vehicle motion; and
 modify the rendered virtual reality media comprises to modify the rendered virtual reality media in response to a determination that the determined present motion of the vehicle matches the vehicle motion sensor data signature.

21. The one or more non-transitory, machine-readable storage media of claim 15, wherein to modify the rendered virtual reality media content comprises to:
 compare the determination motion of the vehicle to a reference threshold; and
 modify the rendered virtual reality media content in response to a determination that the determined motion of the vehicle satisfies is greater than the reference threshold.

* * * * *